(12) United States Patent
Miyazaki

(10) Patent No.: US 9,328,212 B2
(45) Date of Patent: May 3, 2016

(54) RUBBER COMPOSITION FOR CLINCH OR CHAFER, AND PNEUMATIC TIRE

(75) Inventor: Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 38 days.

(21) Appl. No.: 13/527,954

(22) Filed: Jun. 20, 2012

(65) Prior Publication Data

US 2012/0325391 A1 Dec. 27, 2012

(30) Foreign Application Priority Data

Jun. 21, 2011 (JP) .................................. 2011-137541
Jan. 30, 2012 (JP) .................................. 2012-017255

(51) Int. Cl.
| | |
|---|---|
| C08K 3/04 | (2006.01) |
| C08K 3/20 | (2006.01) |
| C08K 5/09 | (2006.01) |
| C08L 7/00 | (2006.01) |
| C08L 9/00 | (2006.01) |
| C08L 9/06 | (2006.01) |
| B60C 1/00 | (2006.01) |

(52) U.S. Cl.
CPC ... *C08K 3/04* (2013.01); *C08K 5/09* (2013.01); *C08L 7/00* (2013.01); *C08L 9/00* (2013.01); *C08L 9/06* (2013.01); *B60C 2001/005* (2013.04); *C08K 3/20* (2013.01); *Y02T 10/862* (2013.01); *Y10T 152/10828* (2015.01)

(58) Field of Classification Search
CPC .............. C08K 3/04; C08K 5/09; C08K 3/20; C08K 13/02; C08K 3/06; C08K 3/22; C08K 3/36; C08K 3/004; C08L 7/00; C08L 9/00; C08L 9/06; C08L 23/16; B06C 2001/005; Y02T 10/862; Y10T 152/10828; B60C 2001/005
USPC ........... 152/547, 543; 524/574, 526, 322, 284
See application file for complete search history.

(56) References Cited

U.S. PATENT DOCUMENTS

| | | | | |
|---|---|---|---|---|
| 3,992,362 | A | 11/1976 | Martin | |
| 4,873,290 | A | 10/1989 | Allen et al. | |
| 5,299,615 | A | 4/1994 | Ataka | |
| 5,872,188 | A | 2/1999 | Datta et al. | |
| 6,329,457 | B1 | 12/2001 | Datta et al. | |
| 8,404,766 | B2 | 3/2013 | Miyazaki | |
| 8,674,014 | B2 * | 3/2014 | Miyazaki | 524/526 |
| 8,674,015 | B2 * | 3/2014 | Miyazaki | 524/526 |
| 2006/0047056 | A1 | 3/2006 | Miyazaki | |
| 2006/0276583 | A1 * | 12/2006 | Miyazaki | 524/574 |
| 2010/0032071 | A1 * | 2/2010 | Miyazaki | 152/525 |
| 2010/0048799 | A1 * | 2/2010 | Miyazaki et al. | 524/526 |
| 2010/0249278 | A1 | 9/2010 | Miyazaki | |
| 2010/0331473 | A1 | 12/2010 | Miyazaki | |

FOREIGN PATENT DOCUMENTS

| | | |
|---|---|---|
| DE | 1 545 520 A1 | 11/1969 |
| DE | 690 08 009 T2 | 7/1994 |
| DE | 691 04 541 T2 | 2/1995 |
| DE | 690 28 918 T2 | 2/1997 |
| EP | 0 463 205 B1 | 1/1992 |
| EP | 0 386 887 B1 | 4/1994 |
| EP | 0 456 437 B1 | 10/1994 |
| GB | 1021472 A | 3/1966 |
| JP | 55-114606 A | 9/1980 |
| JP | 58-13648 A | 1/1983 |
| JP | 58-210943 A | 12/1983 |
| JP | 63-99250 A | 4/1988 |
| JP | 2-88658 A | 3/1990 |
| JP | 4-15111 A | 1/1992 |
| JP | 5-50538 B2 | 7/1993 |
| JP | 5-320421 A | 12/1993 |
| JP | 8-511050 A | 11/1996 |
| JP | 10-501291 A | 2/1998 |
| JP | 2004-238547 A | 8/2004 |
| JP | 2006-63143 A | 3/2006 |
| JP | 2006-137806 A | 6/2006 |
| JP | 2007-191677 A | 8/2007 |
| JP | 2007-246710 A | 9/2007 |
| JP | 2007-302865 A | 11/2007 |
| JP | 2008-24913 A | 2/2008 |
| JP | 2008-303295 A | 12/2008 |
| JP | 2009-7436 A | 1/2009 |
| JP | 2009-256516 A | 11/2009 |
| JP | 2010-37436 A | 2/2010 |
| KR | 100777492 | * 11/2007 |
| WO | WO 94/29380 A1 | 12/1994 |
| WO | WO 95/34601 A1 | 12/1995 |

OTHER PUBLICATIONS

D.D. Flowers et al., "New tire black sidewall composition" Rubber World, vol. 204, No. 5, pp. 26-33, Aug. 1991.
JP 05-320421 A (1993), machine translation.
JP 2006-063143 A (2006), machine translation.
JP 2007-246710 A (2007), machine translation.
JP 2007-302865 A (2007), machine translation.
Office Action issued on Dec. 7, 2012 in U.S. Appl. No. 13/557,911.
US Office Action dated Apr. 22, 2013 for U.S. Appl. No. 13/557,911.

* cited by examiner

*Primary Examiner* — Angela C Scott
(74) *Attorney, Agent, or Firm* — Birch, Stewart, Kolasch & Birch, LLP

(57) ABSTRACT

The present invention aims to provide a rubber composition for a clinch or chafer which enables to improve the rim chafing resistance, elongation at break, handling stability, and fuel economy in a balanced manner, and to reduce the number of broken spews in tire demolding; and a pneumatic tire produced using the rubber composition. The rubber composition for a clinch or chafer includes 100 parts by mass of a rubber component; 1.2 to 2.9 parts by mass of zinc oxide; and 2.2 to 4.0 parts by mass of stearic acid, the rubber component including 15 to 80% by mass of a butadiene rubber and 15 to 50% by mass of an isoprene-based rubber based on 100% by mass of the rubber component.

4 Claims, No Drawings

RUBBER COMPOSITION FOR CLINCH OR CHAFER, AND PNEUMATIC TIRE

TECHNICAL FIELD

The present invention relates to a rubber composition for a clinch or chafer, and a pneumatic tire produced using the rubber composition.

BACKGROUND ART

A clinch and a chafer are provided on the bead portion of a pneumatic tire to be in contact with the rim (i.e. in the chafing part). The rubber composition for producing a clinch or chafer is required to be excellent in the resistance to abrasion caused by contact with the rim (rim chafing resistance), the elongation at break, and the handling stability. Also, cars have been desired to achieve better fuel economy in recent years, which has led to a demand that a rubber composition for producing a clinch or chafer, as well as a rubber composition for producing a tread which accounts for a large portion of a tire, should achieve better fuel economy.

Patent Document 1 teaches a rubber composition for a clinch which is enabled to provide improved fuel economy and crack growth resistance by adjusting the amount of certain rubbers including tin-modified polybutadiene rubber in the rubber component and the amount of zinc oxide to respective values. Patent Document 2 teaches a rubber composition for a clinch which is enabled to have a lower volume resistivity value by blending silica, a silane coupling agent, and ketjen black in predetermined amounts relative to the amount of the rubber component including natural rubber. Notwithstanding there still remains room for improvement in improving the rim chafing resistance, elongation at break, handling stability, and fuel economy in a balanced manner.

Patent Document 1: JP 2008-24913 A
Patent Document 2: JP 2008-303295 A

SUMMARY OF THE INVENTION

The present invention aims to provide a rubber composition for a clinch or chafer which enables to solve the above problem and improve the rim chafing resistance, elongation at break, handling stability, and fuel economy in a balanced manner, and to reduce the number of broken spews in tire demolding; and a pneumatic tire produced using the rubber composition.

The present invention relates to a rubber composition for a clinch or chafer, including: 100 parts by mass of a rubber component; 1.2 to 2.9 parts by mass of zinc oxide; and 2.2 to 4.0 parts by mass of stearic acid, the rubber component including 15 to 80% by mass of a butadiene rubber and 15 to 50% by mass of an isoprene-based rubber based on 100% by mass of the rubber component.

It is preferred that the rubber composition further includes 2.0 to 5.0 parts by mass of a vulcanization accelerator for each 100 parts by mass of the rubber component, and the amount of zinc oxide is 1.3 to 2.0 parts by mass and the amount of stearic acid is 2.5 to 3.5 parts by mass, for each 100 parts by mass of the rubber component.

The rubber composition preferably further includes 1.91 to 2.70 parts by mass of sulfur for each 100 parts by mass of the rubber component.

It is preferred that the rubber composition further includes 1 to 70 parts by mass of carbon black for each 100 parts by mass of the rubber component, and the butadiene rubber includes a 1,2-syndiotactic polybutadiene crystal.

The present invention also relates to a pneumatic tire including a clinch and/or a chafer each produced using the rubber composition.

The rubber composition for a clinch or chafer according to the present invention includes respective predetermined amounts of zinc oxide and stearic acid relative to the amount of the rubber component that contains a butadiene rubber and an isoprene-based rubber in respective specific proportions. Accordingly, the present invention can provide a pneumatic tire having rim chafing resistance, elongation at break, handling stability, and fuel economy which have been improved in a balanced manner. The rubber composition enables to reduce the number of broken spews in tire demolding, thereby leading to excellent productivity.

BEST MODE FOR CARRYING OUT THE INVENTION

The rubber composition for a clinch or chafer according to the present invention includes: 100 parts by mass of a rubber component; 1.2 to 2.9 parts by mass of zinc oxide; and 2.2 to 4.0 parts by mass of stearic acid, the rubber component including 15 to 80% by mass of a butadiene rubber and 15 to 50% by mass of an isoprene-based rubber based on 100% by mass of the rubber component. The above formulation enables balanced improvement of rim chafing resistance, elongation at break, handling stability, and fuel economy, and also reduction of the number of broken spews in tire demolding.

Changing the formulation of the rubber composition for a clinch or chafer to improve the rim chafing resistance, elongation at break, handling stability, and fuel economy in a balanced manner sometimes results in easy breaking of long, thin spews formed in the vent pieces (spew holes) attached to the tire mold, in tire demolding (when the tire is removed from the mold). If spews break in demolding, the broken spews block the spew holes, and therefore at the time of vulcanization of the subsequent tire, they take up the space for passage of air trapped between the raw cover and the mold. As a result, the efficiency of heat transfer from the mold to the raw cover is decreased, leading to an appearance defect called bareness due to undercure. Such bareness would require processes such as buffing repair, repainting, and baking rubber repair, resulting in a decrease in the productivity. Also, cleaning the spew holes requires the use of an electric screw driver or high-pressure water after removal of the tire mold from the press, which also greatly decreases the productivity. Accordingly, in terms of the productivity, it is important to reduce the number of broken spews in tire demolding.

The following two factors are considered to cause spew breaking in tire demolding:

(1) decrease in complex elastic modulus ($E^*$) and elongation at break, due to reversion; and (2) insufficient sliding properties in spew holes.

Hereinafter, factor (1) is explained.

Spews each are surrounded by a metal, and thus have a higher temperature than the tire main body, easily causing reversion. Therefore, reducing the amount of zinc oxide or increasing the amount of stearic acid to improve the properties such as rim chafing resistance is considered to cause reversion, and thereby decrease $E^*$ and elongation at break. Meanwhile, although the clinch and the chafer are required to have a higher $E^*$ value than the sidewall such that good handling stability can be secured, an increase in the $E^*$ tends to result in a decrease in the elongation at break.

In the following, factor (2) is explained.

A rubber composition for a clinch or chafer contains large amounts of a resin (adhesion imparting resin) such as C5 petroleum resin and oil because the composition needs to adhere tightly to a liner film made of polyethylene or polyethylenenaphthalate (PEN) when the extrudate is wound onto the reel, and because the composition contains a large amount of carbon black for securement of the rim chafing resistance, which needs an improvement for easy kneading. Such a formulation probably does not allow easy sliding of the spews in the spew holes.

As described above, a rubber composition for a clinch or chafer of which the properties such as handling stability, rim chafing resistance, and fuel economy are improved is considered to easily cause spew breaking because of its formulation. In contrast, the rubber composition of the present invention includes respective predetermined amounts of zinc oxide and stearic acid relative to the amount of the rubber component including butadiene rubber and an isoprene-based rubber in respective specific proportions. Hence, the rubber composition enables to solve the problem of insufficient sliding properties in the spew holes to reduce the number of broken spews in tire demolding while enabling to improve the rim chafing resistance, elongation at break, handling stability, and fuel economy in a balanced manner.

The rubber composition of the present invention includes a butadiene rubber (BR). The BR is not particularly limited, and examples thereof include high cis BR, BR synthesized using a rare-earth catalyst (rare-earth BR), tin-modified BR, and syndiotactic polybutadiene crystal-containing BR (SPB-containing BR).

The high cis BR is BR having a cis content (proportion of cis-1,4 bond-containing butadiene units in the rubber) of not lower than 90% by mass, preferably not lower than 95% by mass, and more preferably not lower than 97% by mass. The use of high cis BR contributes to balanced improvement of rim chafing resistance, elongation at break, handling stability, and fuel economy.

The cis content can be measured by infrared absorption spectrometry.

The rare-earth BR is a butadiene rubber synthesized using a rare-earth catalyst, and has characteristics of a high cis content and a low vinyl content. The use of rare-earth BR greatly improves the fuel economy, rim chafing resistance, and elongation at break.

The rare-earth catalyst used for synthesizing the rare-earth BR may be a known one such as a catalyst containing a lanthanide rare-earth compound, an organic aluminum compound, an aluminoxane, or a halogen-containing compound, optionally with a Lewis base. Particularly, an Nd catalyst is preferred which contains a neodymium (Nd)-containing compound as the lanthanide rare-earth compound.

Examples of the lanthanide rare-earth compound include halides, carboxylates, alcoholates, thioalcoholates, and amides of rare-earth metals with an atomic number of 57 to 71. Among these, Nd catalysts are preferred as described above in terms of obtaining BR having a high cis content and a low vinyl content.

The organic aluminum compound may be one represented by $AlR^aR^bR^c$ (wherein $R^a$, $R^b$, and $R^c$ are the same as or different from each other, each representing hydrogen or a C1 to C8 hydrocarbon group). Examples of the aluminoxane include acyclic aluminoxanes and cyclic aluminoxanes. Examples of the halogen-containing compound include aluminum halides represented by $AlX_kR^d_{3-k}$ (wherein X represents a halogen, $R^d$ represents a C1 to C20 alkyl group, aryl group, or aralkyl group, and k represents 1, 1.5, 2, or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base is used for complexing the lanthanide rare-earth compound, and may suitably be a compound such as acetylacetone, a ketone, and an alcohol.

The rare-earth catalyst may be used dissolved in an organic solvent (e.g. n-hexane, cyclohexane, n-heptane, toluene, xylene, benzene) or supported on an appropriate carrier (e.g. silica, magnesia, magnesium chloride) at the time of the polymerization of butadiene. With regard to the polymerization conditions, the polymerization may be either solution polymerization or bulk polymerization, the preferred polymerization temperature is –30° C. to 150° C., and the polymerization pressure may be any pressure depending on the other conditions.

The rare-earth BR preferably has a ratio (Mw/Mn) of the weight average molecular weight (Mw) to the number average molecular weight (Mn) of not less than 1.2, and more preferably not less than 1.5. If the ratio is less than 1.2, the processability tends to decrease. The rare-earth BR preferably has an Mw/Mn of not more than 5, and more preferably not more than 4. If the ratio is more than 5, the effect of improving the rim chafing resistance tends to be small.

The rare-earth BR preferably has an Mw of not less than 300,000 and more preferably not less than 500,000, but preferably not more than 1,500,000 and more preferably not more than 1,200,000. Also, the rare-earth BR preferably has an Mn of not less than 100,000 and more preferably not less than 150,000, but preferably not more than 1,000,000 and more preferably not more than 800,000. If the Mw and Mn are less than the respective lower limits, the rim chafing resistance and fuel economy tend to decrease. If the Mw and Mn are more than the respective upper limits, the processability may decrease.

The Mw and Mn herein are values determined by gel permeation chromatography (GPC) and calibrated relative to polystyrene standards.

The rare-earth BR preferably has a cis content of not lower than 90% by mass, more preferably not lower than 93% by mass, and still more preferably not lower than 95% by mass. If the rare-earth BR has a cis content of lower than 90% by mass, the rim chafing resistance and fuel economy may decrease.

The rare-earth BR preferably has a vinyl content of not higher than 1.8% by mass, more preferably not higher than 1.0% by mass, still more preferably not higher than 0.5% by mass, and particularly preferably not higher than 0.3% by mass. If the vinyl content is higher than 1.8% by mass, the rim chafing resistance may decrease.

The vinyl content can be measured by infrared absorption spectrometry.

It is preferred that the tin-modified BR is obtained by polymerizing 1,3-butadiene by a lithium initiator, and then adding a tin compound, so that the tin-modified BR molecule is terminated with a tin-carbon bond. The use of tin-modified BR enables to greatly increase the fuel economy.

Examples of the lithium initiator include lithium compounds such as alkyllithium, aryllithium, allyllithium, vinyllithium, organotinlithium, and organonitrogenlithium compounds. The use of a lithium compound as an initiator for the BR polymerization enables to produce tin-modified BR with high vinyl content and low cis content.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene.

The tin atom content in the tin-modified BR is not lower than 50 ppm, and preferably not lower than 60 ppm. If the tin atom content is less than 50 ppm, the effect of accelerating the dispersion of carbon black tends to be small. The tin atom content is not higher than 3000 ppm, preferably not higher than 2500 ppm, and more preferably not higher than 250 ppm. If the tin atom content is higher than 3000 ppm, the kneaded mixture tends to show poor cohesiveness to give rough edges, and thereby the extrusion processability of the kneaded mixture tends to decrease.

The molecular weight distribution (Mw/Mn) of the tin modified BR is not higher than 2, and preferably not higher than 1.5. If the Mw/Mn is higher than 2, the dispersibility of carbon black tends to decrease and the tan δ tends to increase. The lower limit of the molecular weight distribution is not particularly limited, but is preferably not lower than 1.

The vinyl content of the tin-modified BR is preferably not lower than 5% by mass, and more preferably not lower than 7% by mass in terms of excellent productivity. The vinyl content is preferably not higher than 50% by mass, and more preferably not higher than 20% by mass in terms of excellent rim chafing resistance.

The SPB-containing BR may be one generally used in the tire industry, and is preferably one having 1,2-syndiotactic polybutadiene crystals chemically bonded with BR and dispersed. The SPB crystals contained enable to greatly increase the handling stability and rim chafing resistance. Further, the SPB crystals aligned in the rubber composition in the spew holes contribute to an increase in the hardness and strength of the rubber composition, leading to a further reduction in the number of broken spews in tire demolding.

The 1,2-syndiotactic polybutadiene crystal preferably has a melting point of not lower than 180° C., and more preferably not lower than 190° C. If the melting point of SPB is lower than 180° C., the handling stability and rim chafing resistance may not be sufficiently improved. Also, the 1,2-syndiotactic polybutadiene crystal preferably has a melting point of not higher than 220° C., and more preferably not higher than 210° C. If the melting point of SPB is higher than 220° C., the dispersibility in the rubber composition may decrease.

The 1,2-syndiotactic polybutadiene crystal content in the SPB-containing BR is not lower than 2.5% by mass, and preferably not lower than 10% by mass. If the content is lower than 2.5% by mass, the handing stability and rim chafing resistance may not be sufficiently improved. The 1,2-syndiotactic polybutadiene crystal content is not higher than 20% by mass, and preferably not higher than 18% by mass. If the content is higher than 20% by mass, such BR tends not to be easily dispersed in the rubber composition, which tends to result in a decrease in the processability.

The BR content based on 100% by mass of the rubber component is not lower than 15% by mass, and preferably not lower than 50% by mass. If the content is lower than 15% by mass, sufficient rim chafing resistance may not be secured. The BR content is not higher than 80% by mass, and preferably not higher than 70% by mass. If the content is higher than 80% by mass, the elongation at break tends to decrease.

The rubber composition of the present invention includes an isoprene-based rubber. Examples of the isoprene-based rubber include natural rubber (NR), highly purified natural rubber (HPNR), isoprene rubber (IR), and liquid isoprene rubber (L-IR). Particularly, NR is preferred in terms of achieving good elongation at break.

The NR may be one usually used in the tire industry, such as SIR20, RSS#3, and TSR20.

The isoprene-based rubber content based on 100% by mass of the rubber component is not lower than 15% by mass, and preferably not lower than 20% by mass. If the content is lower than 15% by mass, sufficient elongation at break may not be secured. The isoprene-based rubber content is not higher than 50% by mass, and preferably not higher than 48% by mass. If the content is higher than 50% by mass, the rim chafing resistance tends to decrease.

Examples of rubbers other than the BR and isoprene-based rubber, which may be included in the rubber component of the rubber composition of the present invention, include diene rubbers such as styrene butadiene rubber (SBR) and ethylene-propylene-diene rubber (EPDM).

The rubber composition of the present invention includes zinc oxide. Zinc oxide adsorbs sulfur at first and thus serves to progress the curing reaction slowly, thereby suppressing reversion. The zinc oxide is not particularly limited, and ones generally used in the tire industry, such as zinc oxides #1 to #3, may be used.

The amount of zinc oxide is not less than 1.2 parts by mass, and preferably not less than 1.3 parts by mass for each 100 parts by mass of the rubber component. If the amount is less than 1.2 parts by mass, the reversion cannot be sufficiently suppressed, which tends to result in easy spew breaking. The amount is not more than 2.9 parts by mass, preferably not more than 2.0 parts by mass, and more preferably not more than 1.8 parts by mass for each 100 parts by mass of the rubber component. If the amount is more than 2.9 parts by mass, sufficient rim chafing resistance may not be secured.

The rubber composition of the present invention includes stearic acid. The use of stearic acid enables to activate the curing reaction, leading to an appropriate crosslink density and even a high E* value. The use also enables to improve the sliding properties of spews in the spew holes. The stearic acid is not particularly limited, and ones generally used in the tire industry can be used.

The amount of stearic acid is not less than 2.2 parts by mass, and preferably not less than 2.5 parts by mass for each 100 parts by mass of the rubber component. If the amount is less than 2.2 parts by mass, an appropriate crosslink density cannot be achieved, which tends to result in easy spew breaking. The amount is not more than 4.0 parts by mass, preferably not more than 3.5 parts by mass, and more preferably not more than 3.2 parts by mass for each 100 parts by mass of the rubber component. If the amount is more than 4.0 parts by mass, the effects that are proportionate to the increased amount tend not to be achieved. Also in this case, the stearic acid may bloom (form a crystal) to the surface of the rubber composition, thereby decreasing the adhesion to the liner film made of polyethylene or PEN. Further, the elongation at break after vulcanization tends to decrease.

The rubber composition of the present invention preferably includes a vulcanization accelerator. The vulcanization accelerator is not particularly limited, and examples thereof includes ones generally used in the tire industry, such as N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazole (MBT), dibenzothiazolyl disulfide (MBTS), and diphenylguanidine (DPG). Among these, TBBS can be suitably used.

The amount of vulcanization accelerator is preferably not less than 2.0 parts by mass, more preferably not less than 2.5 parts by mass, and still more preferably not less than 2.8 parts by mass for each 100 parts by mass of the rubber component.

If the amount is less than 2.0 parts by mass, the curing reaction may not be sufficiently activated because the amount of zinc oxide is decreased. The amount of vulcanization accelerator is preferably not more than 5.0 parts by mass, and more preferably not more than 4.0 parts by mass for each 100 parts by mass of the rubber component. If the amount is more than 5.0 parts by mass, the rim chafing resistance tends to decrease.

The rubber composition of the present invention preferably includes sulfur. The sulfur is not particularly limited, and ones generally used in the tire industry may be used. Examples of usable sulfur include powdered sulfur, precipitated sulfur, colloidal sulfur, insoluble sulfur, and highly dispersible sulfur. Among these, insoluble sulfur can be suitably used.

The amount of sulfur is preferably not less than 1.91 parts by mass, and more preferably not less than 2.00 parts by mass for each 100 parts by mass of the rubber component, in terms of good elongation at break. The amount of sulfur is preferably not more than 2.70 parts by mass, and more preferably not more than 2.50 parts by mass for each 100 parts by mass of the rubber component, in terms of good rim chafing resistance.

In the case that the sulfur is insoluble sulfur, the amount of sulfur indicates the amount of pure sulfur excluding the oil content.

The rubber composition of the present invention preferably includes carbon black. The use of carbon black enables to secure good electrical conductivity (electrical continuity), and thus the static electricity accumulated in the car can be efficiently released in the order of the tire rim→clinch→sidewall→tread→road surface. The carbon black is not particularly limited, and ones generally used in the tire industry can be used.

The nitrogen adsorption specific surface area ($N_2SA$) of carbon black is preferably not smaller than 25 $m^2/g$, and more preferably not smaller than 30 $m^2/g$, while the $N_2SA$ is preferably not larger than 100 $m^2/g$, more preferably not larger than 80 $m^2/g$, and still more preferably not larger than 75 $m^2/g$. If the $N_2SA$ is smaller than the lower limit value, the reinforcement may be low, and therefore sufficient rim chafing resistance may not be achieved. If the $N_2SA$ is greater than the upper limit value, the fuel economy tends to decrease. For the same reasons, the iodine adsorption of carbon black is preferably not less than 15 mg/g, and more preferably not less than 25 mg/g, while the iodine adsorption is preferably not more than 90 mg/g, more preferably not more than 70 mg/g, and still more preferably not more than 65 mg/g.

The $N_2SA$ of carbon black herein is measured based on JIS K6217-2:2001, and the iodine adsorption of carbon black herein is measured by the method A based on JIS K6217-1:2008.

The amount of carbon black is preferably not less than 1 part by mass, more preferably not less than 40 parts by mass, and still more preferably not less than 50 parts by mass for each 100 parts by mass of the rubber component. If the amount is less than 1 part by mass, sufficient electrical conductivity may not be secured. The amount is preferably not more than 70 parts by mass, and more preferably not more than 68 parts by mass for each 100 parts by mass of the rubber component. If the amount is more than 70 parts by mass, the fuel economy and processability tend to decrease.

The carbon black may be high structure conductive carbon black such as graphitized carbon black, acetylene black, and ketjen black. Such carbon black enables to secure high electrical conductivity even when it is used in a small amount (1 to 10 parts by mass for each 100 parts by mass of the rubber component), thereby leading to further improvement in the fuel economy. Examples of commercially available conductive carbon black include Printex XE2B produced by Degussa.

The rubber composition of the present invention may include silica. The use of silica can greatly improve the fuel economy. The use also greatly increases the elongation at break, leading to a further reduction in the number of broken spews. The silica is not particularly limited, and ones generally used in the tire industry can be used. Further, the silica may be used in combination with a silane coupling agent.

In the case that the rubber composition of the present invention includes silica, the amount of silica is preferably not less than 1 part by mass, and more preferably not less than 5 parts by mass for each 100 parts by mass of the rubber component. If the amount is less than 1 part by mass, the effects that should be achieved by the addition of silica may be not sufficiently achieved. The amount is preferably not more than 20 parts by mass, and more preferably not more than 12 parts by mass for each 100 parts by mass of the rubber component. If the amount is more than 20 parts by mass, the rim chafing resistance tends to decrease.

Partial substitution of carbon black by silica or use of carbon black having a low $N_2SA$ value tends to decrease the rim chafing resistance. Therefore, in such a case, it is preferred to use the SPB-containing BR together to secure good rim chafing resistance.

The rubber composition of the present invention may preferably include wax. The wax will bloom to the surface of the rubber composition, which enables easy sliding of spews in the spew holes, leading to a further reduction in the number of broken spews. The wax is not particularly limited, and ones generally used in the tire industry, such as n-alkane-based petroleum waxes and natural waxes, can be used.

The amount of wax is preferably not less than 0.5 parts by mass, more preferably not less than 0.8 parts by mass, and still more preferably not less than 1.0 part by mass for each 100 parts by mass of the rubber component. If the amount is less than 0.5 parts by mass, the effects that should be achieved by the addition of wax may be not sufficiently achieved. The amount is preferably not more than 3.0 parts by mass, more preferably not more than 2.0 parts by mass, and still more preferably not more than 1.8 parts by mass for each 100 parts by mass of the rubber component. If the amount is more than 3.0 parts by mass, the wax may bloom excessively, likely resulting in an appearance defect (whitening).

The rubber composition of the present invention may optionally contain additives usually used in production of a rubber composition, such as an antioxidant of any kind, oil, resin (adhesion-imparting resin), and a mold-release agent, as well as the above ingredients.

The use of oil and/or resin enables to achieve good adhesion. The oil may be, for example, oil such as process oil, aromatic oil, and vegetable oil and fat. The resin may be, for example, resin such as C5 petroleum resin, liquid cumarone indene resin, and solid cumarone indene resin.

The total amount of oil and resin is preferably not less than 2 parts by mass, and more preferably not less than 5 parts by mass for each 100 parts by mass of the rubber component because such an amount contributes to good adhesion to the liner film made of polyethylene or polyethylenenaphthalate (PEN) when the extruded rubber composition is wound onto the reel. The total amount is preferably not more than 12 parts by mass, and more preferably not more than 10 parts by mass for each 100 parts by mass of the rubber component, in terms of good sliding properties in the spew holes.

Here, partial substitution of oil by resin increases the elongation at break and therefore increases the effect of reducing the number of broken spews, and also contributes to good rim chafing resistance. In the case of using oil and resin in combination, the amount of oil is preferably 1 to 7 parts by mass, and the amount of resin is preferably 1 to 5 parts by mass, for each 100 parts by mass of the rubber component. If the amount of resin is more than 5 parts by mass, the adhesion tends to increase excessively, leading to a decrease in the building processability, and productivity.

The softening point of resin is preferably not lower than 50° C., and more preferably not lower than 80° C. in terms of good elongation at break, but is preferably not higher than 150° C., and more preferably not higher than 120° C. in terms of good building processability, and productivity.

The softening point herein, which is measured as set forth in JIS K 6220-1:2001 with a ring and ball softening point apparatus, is the temperature at which the ball drops down.

The use of a mold-release agent enables easy sliding of spews in the spew holes, leading to a further reduction in the number of broken spews. The mold-release agent suitably used may be, for example, a mixture of a fatty acid metal salt and a fatty acid amide. The amount of mold-release agent is preferably 0.1 to 10 parts by mass, and more preferably 0.5 to 3 parts by mass for each 100 parts by mass of the rubber component.

The method for producing the rubber composition of the present invention may be a known one such as a method including kneading the above ingredients in a rubber kneader such as an open roll mill or a Bunbary mixer, and then vulcanizing the kneaded mixture.

The rubber composition of the present invention can be used for the clinch or chafer of a pneumatic tire; a specific example thereof is a component shown in, for example, FIG. 2 of JP 2009-137437 A. It is noted that the chafer may be a canvas chafer that includes a fabric and a topping rubber composition covering the fabric, or may be a rubber chafer that only includes a rubber composition without a fabric.

The pneumatic tire of the present invention can be produced by a usual method using the above rubber composition. Specifically, the method may include extruding and processing, before vulcanization, the rubber composition into the shape of a clinch or chafer, molding the resultant extrudate and assembling the resultant component with other tire components by a usual method on a tire building machine so as to form an unvulcanized tire, and heating the unvulcanized tire under pressure in a vulcanizer.

A tire mold used in tire production is provided with tens to hundreds of spew holes in a wide range of areas including the tread, side wall, and bead (clinch, chafer) areas. Many spew holes are provided in the areas where air easily remains in the gap between the raw cover (unvulcanized cover) and the mold, such as the tread edge area, the vicinities of the side wall area having the maximum width, and the bead heel area.

Too large a diameter of the spew hole may prevent close contact between the rim and the tire when the spew is bent, and thereby the air sealing may be inhibited. Meanwhile, too small a diameter of the spew hole may lead to easy spew breaking in demolding. Therefore, the diameter of the spew hole is preferably 0.3 to 2.0 mm. The length (depth) of the spew hole should just be about 12 mm. The distance between the spew holes in the case of the bead area may be about 10 cm, depending on the difference between the shapes of the raw cover and mold.

The pneumatic tire of the present invention can be suitably used for passenger cars, commercial cars (light trucks), trucks/buses, industrial vehicles and the like. Particularly suitable among these are passenger cars and commercial cars.

EXAMPLES

Hereinafter, the present invention will be described in more detail based on the examples which, however, are not intended to limit the scope of the present invention.

The various chemical agents used in Examples and Comparative Examples are listed below.

NR: TSR20

IR: IR2200 from JSR Corporation

BR1 (high cis BR): BR150B (cis content: 97% by mass) from Ube Industries, Ltd.

BR2 (rare-earth BR): CB24 (BR synthesized using Nd catalyst, cis content: 96% by mass, vinyl content: 0.7% by mass, $ML_{1+4}$ (100° C.): 45, Mw/Mn: 2.69, Mw: 500,000, Mn: 186,000) from LANXESS BR3 (tin-modified BR): BR1250H (tin-modified BR polymerized using lithium initiator, vinyl content: 10 to 13% by mass, Mw/Mn: 1.5, tin atom content: 250 ppm) from Zeon Corporation BR4 (SPB-containing BR): VCR617 (SPB-containing BR, SPB content: 17% by mass, melting point of SPB: 200° C., amount of boiling n-hexane insoluble matter: 15 to 18% by mass) from Ube Industries, Ltd.

Carbon black 1: DIABLACK N351H($N_2SA$: 69 $m^2/g$, iodine adsorption: 57 mg/g) from Mitsubishi Chemical Corporation Carbon black 2 (conductive carbon black): Printex XE2B (iodine adsorption: 1125 mg/g) from Degussa Silica: ULTRASIL VN3 ($N_2SA$: 175 $m^2/g$, iodine adsorption: 165 mg/g) from Degussa Oil: VivaTec 500 (TDAE oil) from H&R Group Resin: Marukarez T-100AS (C5 petroleum resin: aliphatic petroleum resin mainly produced from olefins and diolefins in the C5 fraction obtained by naphtha cracking, softening point: 100° C.) from Maruzen Petrochemical Co., Ltd.

Mold-release agent: WB16 (mixture of fatty acid metal salt (calcium salt of fatty acid) and fatty acid amide) from Struktol Zinc oxide: zinc oxide #2 from Mitsui Mining & Smelting Co., Ltd.

Stearic acid: Tsubaki from NOF Corporation

Wax: SUNNOC N from Ouchi Shinko Chemical Industrial Co., Ltd.

Antioxidant 6PPD: Antigene 6C(N-phenyl-N'-(1,3-dimethylbutyl)-p-phenylenediamine) from Sumitomo Chemical Co., Ltd.

10% oil-containing insoluble sulfur: Seimisulfur (insoluble sulfur containing at least 60% of matter insoluble in carbon disulfide, oil content: 10% by mass) from Nippon Kanryu Industry Co., Ltd.

Vulcanization accelerator TBBS: Nocceler NS(N-tert-butyl-2-benzothiazolylsulfenamide) from Ouchi Shinko Chemical Industrial Co., Ltd.

Examples and Comparative Examples

The chemical agents in amounts shown in Table 1 or Table 2, except the sulfur and vulcanization accelerator, were kneaded in a 1.7-L Banbury mixer. Thereafter, the sulfur and vulcanization accelerator were added to the kneaded mixture and kneaded using a roll mill, whereby an unvulcanized rubber composition was produced.

A portion of the produced unvulcanized rubber composition was press-vulcanized for 12 minutes at 170° C., so that a vulcanized rubber composition was produced.

Another portion of the unvulcanized rubber composition was processed into the shapes of a clinch and a chafer and used to produce an unvulcanized tire. The unvulcanized tire was vulcanized at 170° C. for 12 minutes, so that a test tire (tire size: 225/70R16 117/115) was produced.

The obtained vulcanized rubber compositions and test tires were evaluated by the following methods. Tables 1 and 2 show the results.

(Viscoelasticity Test)

The complex elastic modulus (E*) (MPa) and loss tangent (tan δ) of each vulcanized rubber composition were measured using a viscoelasticity spectrometer VES (produced by Iwamoto Seisakusho Co., Ltd.) under the following conditions: a temperature of 70° C.; a frequency of 10 Hz; an initial strain of 10%; and a dynamic strain of 2%. A larger E* corresponds to higher rigidity and better handling stability. A smaller tan δ corresponds to less heat build-up and better fuel economy.

(Rolling Resistance)

The rolling resistance of each test tire was measured in accordance with JIS D 4234:2009 and using a rolling resistance tester under the following conditions: an internal pressure of 230 kPa; a load of 3.43 kN; and a speed of 80 km/h after the tire was mounted on a JIS standard rim. The improvement ratio of the rolling resistance (the ratio of reduction in the rolling resistance) was calculated from the following formula.

Improvement ratio of rolling resistance=(rolling resistance in Comparative Example 1−rolling resistance of each formulation)/(rolling resistance in Comparative Example 1)×100

(Tensile Test)

Using a No. 3 dumbbell-shaped test piece made of each vulcanized rubber composition, a tensile test was carried out at room temperature in accordance with JIS K 6251:2010 "Rubber, vulcanized or thermoplastic—Determination of tensile stress-strain properties," and the elongation at break EB (%) was measured. A higher EB value indicates better elongation at break. The composition has no practical problems if the EB value is not lower than 245.

(Rim Chafing Abrasion Test)

Each test tire was run on a drum at a speed of 20 km/h for 600 hours under the condition of a load of 230% of the maximum load (maximum internal pressure) under the JIS standard. After that, the abrasion depth at the rim flange contact portion was measured. The rim chafing resistance of each formulation is expressed as an index based on the following formula. A larger index corresponds to better rim chafing resistance. The tire has no practical problems if the index is not less than 90.

(Rim chafing resistance index)=(abrasion depth in Comparative Example 1)/(abrasion depth of each formulation)×100

(Spew Breaking Evaluation)

The number of broken spews on the clinch and chafer in demolding of each test tire was counted for at least 100 tires. The number of broken spews of each formulation is expressed as an index value based on the following formula. A larger index indicates less possibility of spew breaking. The tire has no practical problems if the index is not less than 90.

(Spew breaking index)=(the number of broken spews in Comparative Example 1)/(the number of broken spews of each formulation)×100

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Amount (parts by mass) | NR | 35 | 25 | 35 | 35 | 35 | 35 | 35 | 35 | 35 | 35 | 25 | 45 |
| | IR | — | 10 | — | — | — | — | — | — | — | — | — | — |
| | BR1 (high cis BR) | 65 | 65 | 65 | 65 | 65 | 65 | 65 | 65 | 65 | 65 | 75 | 55 |
| | BR2 (rare-earth BR) | — | — | — | — | — | — | — | — | — | — | — | — |
| | BR3 (tin-modified BR) | — | — | — | — | — | — | — | — | — | — | — | — |
| | BR4 (SPB-containing BR) | — | — | — | — | — | — | — | — | — | — | — | — |
| | Carbon black 1 | 65 | 65 | 65 | 65 | 65 | 65 | 65 | 65 | 65 | 65 | 65 | 65 |
| | Carbon black 2 | — | — | — | — | — | — | — | — | — | — | — | — |
| | Silica | — | — | — | — | — | — | — | — | — | — | — | — |
| | Oil | 8 | 8 | 8 | 8 | 8 | 8 | 8 | 8 | 8 | 8 | 8 | 8 |
| | Resin | — | — | — | — | — | — | — | — | — | — | — | — |
| | Mold-release agent | — | — | — | — | — | — | — | — | — | — | — | — |
| | Zinc oxide | 1.7 | 1.7 | 1.7 | 1.7 | 1.3 | 1.3 | 1.3 | 2.5 | 2.5 | 2.5 | 1.7 | 1.7 |
| | Stearic acid | 3.0 | 3.0 | 4.0 | 2.5 | 3.0 | 4.0 | 2.5 | 3.0 | 4.0 | 2.5 | 3.0 | 3.0 |
| | Wax | 1 | 1 | 1 | 1 | 1 | 1 | 1 | 1 | 1 | 1 | 1 | 1 |
| | Antioxidant 6PPD | 2 | 2 | 2 | 2 | 2 | 2 | 2 | 2 | 2 | 2 | 2 | 2 |
| | 10% oil-containing insoluble sulfur | 2.33 | 2.33 | 2.33 | 2.33 | 2.33 | 2.33 | 2.33 | 2.33 | 2.33 | 2.33 | 2.33 | 2.33 |
| | Vulcanization accelerator TBBS | 3 | 3 | 3 | 3 | 3 | 3 | 3 | 3 | 3 | 3 | 3 | 3 |
| Evaluation | E* 70° C. | 7.13 | 7.04 | 7.25 | 7.06 | 7.03 | 7.12 | 6.95 | 7.23 | 7.35 | 7.26 | 7.14 | 6.99 |
| | tan δ 70° C. | 0.109 | 0.106 | 0.104 | 0.111 | 0.112 | 0.108 | 0.120 | 0.106 | 0.101 | 0.105 | 0.106 | 0.114 |
| | Improvement ratio of rolling resistance (%) | 0.9 | 0.9 | 1.0 | 0.9 | 0.8 | 0.9 | 0.7 | 0.9 | 1.0 | 1.0 | 0.9 | 0.8 |
| | Elongation at break (%) Acceptable value ≥245 | 270 | 265 | 260 | 270 | 260 | 245 | 255 | 275 | 250 | 275 | 255 | 290 |
| | Rim chafing resistance index Acceptable value ≥90 | 102 | 102 | 99 | 102 | 104 | 102 | 104 | 93 | 92 | 91 | 105 | 95 |
| | Spew breaking index Acceptable value ≥90 | 105 | 104 | 106 | 90 | 102 | 103 | 90 | 107 | 108 | 94 | 100 | 120 |

TABLE 1-continued

|  |  | Example | | | | | | | | | | | |
|---|---|---|---|---|---|---|---|---|---|---|---|---|
|  |  | 13 | 14 | 15 | 16 | 17 | 18 | 19 | 20 | 21 | 22 | 23 | 24 |
| Amount (parts by mass) | NR | 35 | 35 | 35 | 35 | 35 | 35 | 35 | 30 | 35 | 35 | 35 | 35 |
|  | IR | — | — | — | — | — | — | — | — | — | — | — | — |
|  | BR1 (high cis BR) | 65 | 65 | 65 | — | — | — | — | — | 65 | 65 | — | 65 |
|  | BR2 (rare-earth BR) | — | — | — | — | — | 65 | — | — | — | — | — | — |
|  | BR3 (tin-modified BR) | — | — | — | — | 20 | — | 20 | 55 | — | — | — | — |
|  | BR4 (SPB-containing BR) | — | — | — | 65 | 45 | — | 45 | 15 | — | — | 65 | — |
|  | Carbon black 1 | 65 | 65 | 65 | 61 | 63 | 65 | 63 | 55 | 65 | 65 | 40 | 65 |
|  | Carbon black 2 | — | — | — | — | — | — | — | — | — | — | 5 | — |
|  | Silica | — | — | — | — | — | — | — | 10 | — | — | 10 | — |
|  | Oil | 8 | 8 | 8 | 8 | 8 | 8 | 8 | 8 | 6 | 4 | 3 | 8 |
|  | Resin | — | — | — | — | — | — | — | — | 2 | 4 | 3 | — |
|  | Mold-release agent | — | — | — | — | — | — | — | — | — | — | — | 1 |
|  | Zinc oxide | 1.7 | 1.7 | 1.7 | 1.7 | 1.7 | 1.7 | 2.9 | 1.7 | 1.7 | 1.7 | 1.7 | 1.3 |
|  | Stearic acid | 3.0 | 3.0 | 3.0 | 3.0 | 3.0 | 3.0 | 2.2 | 3.0 | 3.0 | 3.0 | 3.0 | 2.5 |
|  | Wax | 1 | 1 | 1 | 1 | 1 | 1 | 1 | 1 | 1 | 1 | 1 | 1 |
|  | Antioxidant 6PPD | 2 | 2 | 2 | 2 | 2 | 2 | 2 | 2 | 2 | 2 | 2 | 2 |
|  | 10% oil-containing insoluble sulfur | 2.12 | 2.60 | 2.90 | 2.33 | 2.33 | 2.33 | 2.33 | 2.33 | 2.33 | 2.33 | 2.33 | 2.33 |
|  | Vulcanization accelerator TBBS | 3.8 | 2.5 | 2 | 3 | 3 | 3 | 3 | 3 | 3 | 3 | 3 | 3 |
| Evaluation | E* 70° C. | 7.15 | 7.13 | 7.15 | 7.45 | 7.11 | 7.25 | 7.33 | 6.95 | 7.24 | 7.36 | 6.99 | 6.99 |
|  | tan δ 70° C. | 0.098 | 0.112 | 0.114 | 0.110 | 0.088 | 0.099 | 0.082 | 0.075 | 0.110 | 0.112 | 0.075 | 0.123 |
|  | Improvement ratio of rolling resistance (%) | 1.1 | 0.8 | 0.8 | 0.9 | 1.3 | 1.1 | 1.4 | 1.5 | 0.9 | 0.8 | 2 | 0.7 |
|  | Elongation at break (%) Acceptable value ≥245 | 245 | 280 | 285 | 270 | 250 | 280 | 285 | 295 | 285 | 290 | 310 | 255 |
|  | Rim chafing resistance index Acceptable value ≥90 | 102 | 99 | 95 | 120 | 105 | 105 | 101 | 100 | 102 | 104 | 91 | 100 |
|  | Spew breaking index Acceptable value ≥90 | 98 | 109 | 115 | 108 | 105 | 108 | 100 | 101 | 107 | 107 | 108 | 105 |

TABLE 2

|  |  | Comparative Example | | | | | | | |
|---|---|---|---|---|---|---|---|---|---|
|  |  | 1 | 2 | 3 | 4 | 5 | 6 | 7 | 8 |
| Amount (parts by mass) | NR | 35 | 35 | 35 | 35 | 35 | 35 | 35 | 35 |
|  | IR | — | — | — | — | — | — | — | — |
|  | BR1 (high cis BR) | 65 | 65 | 65 | 65 | 65 | 65 | 65 | 65 |
|  | BR2 (rare-earth BR) | — | — | — | — | — | — | — | — |
|  | BR3 (tin-modified BR) | — | — | — | — | — | — | — | — |
|  | BR4 (SPB-containing BR) | — | — | — | — | — | — | — | — |
|  | Carbon black 1 | 68 | 65 | 65 | 65 | 65 | 65 | 65 | 65 |
|  | Silica | — | — | — | — | — | — | — | — |
|  | Oil | 8 | 8 | 8 | 8 | 8 | 8 | 8 | 8 |
|  | Zinc oxide | 4.0 | 1.7 | 1.7 | 1.7 | 1.7 | 1.0 | 1.0 | 1.0 |
|  | Stearic acid | 2.0 | 2.0 | 1.5 | 4.5 | 5.0 | 3.0 | 4.0 | 2.5 |
|  | Wax | 1 | 1 | 1 | 1 | 1 | 1 | 1 | 1 |
|  | Antioxidant 6PPD | 2 | 2 | 2 | 2 | 2 | 2 | 2 | 2 |
|  | 10% oil-containing insoluble sulfur | 2.00 | 2.33 | 2.33 | 2.33 | 2.33 | 2.33 | 2.33 | 2.33 |
|  | Vulcanization accelerator TBBS | 2 | 3 | 3 | 3 | 3 | 3 | 3 | 3 |
| Evaluation | E* (70° C.) | 7.05 | 7.02 | 6.95 | 7.3 | 7.32 | 6.82 | 6.93 | 6.62 |
|  | tan δ (70° C.) | 0.155 | 0.118 | 0.122 | 0.103 | 0.102 | 0.129 | 0.126 | 0.140 |
|  | Improvement ratio of rolling resistance (%) | Reference value | 0.7 | 0.6 | 1.0 | 1.0 | 0.5 | 0.6 | 0.3 |
|  | Elongation at break (%) Acceptable value ≥245 | 285 | 275 | 280 | 240 | 220 | 230 | 215 | 235 |
|  | Rim chafing resistance value Acceptable value ≥90 | 100 | 99 | 95 | 95 | 85 | 104 | 102 | 104 |
|  | Spew breaking index Acceptable value ≥90 | 100 | 70 | 60 | 101 | 95 | 102 | 103 | 85 |

|  |  | Comparative Example | | | | | | |
|---|---|---|---|---|---|---|---|---|
|  |  | 9 | 10 | 11 | 12 | 13 | 14 | 15 |
| Amount (parts by | NR | 35 | 35 | 35 | 35 | 35 | 35 | 35 |
|  | IR | — | — | — | — | — | — | — |

TABLE 2-continued

| | | | | | | | | |
|---|---|---|---|---|---|---|---|---|
| mass) | BR1 (high cis BR) | 65 | 65 | 65 | 65 | 65 | 65 | 65 |
| | BR2 (rare-earth BR) | — | — | — | — | — | — | — |
| | BR3 (tin-modified BR) | — | — | — | — | — | — | — |
| | BR4 (SPB-containing BR) | — | — | — | — | — | — | — |
| | Carbon black 1 | 65 | 65 | 65 | 65 | 65 | 65 | 65 |
| | Silica | — | — | — | — | — | — | — |
| | Oil | 8 | 8 | 8 | 8 | 8 | 8 | 8 |
| | Zinc oxide | 3.5 | 3.5 | 3.5 | 4.0 | 4.0 | 4.0 | 4.0 |
| | Stearic acid | 3.0 | 4.0 | 2.5 | 3.0 | 4.0 | 2.5 | 5.0 |
| | Wax | 1 | 1 | 1 | 1 | 1 | 1 | 1 |
| | Antioxidant 6PPD | 2 | 2 | 2 | 2 | 2 | 2 | 2 |
| | 10% oil-containing insoluble sulfur | 2.33 | 2.33 | 2.33 | 2.33 | 2.33 | 2.33 | 2.33 |
| | Vulcanization accelerator TBBS | 3 | 3 | 3 | 3 | 3 | 3 | 3 |
| Evaluation | E* (70° C.) | 7.33 | 7.45 | 7.34 | 7.55 | 7.6 | 7.55 | 7.65 |
| | tan δ (70° C.) | 0.099 | 0.098 | 0.102 | 0.096 | 0.096 | 0.095 | 0.094 |
| | Improvement ratio of rolling resistance (%) | 1.1 | 1.1 | 1.0 | 1.1 | 1.1 | 1.2 | 1.2 |
| | Elongation at break (%) Acceptable value ≥245 | 280 | 255 | 285 | 275 | 250 | 280 | 225 |
| | Rim chafing resistance value Acceptable value ≥90 | 87 | 86 | 87 | 85 | 84 | 84 | 81 |
| | Spew breaking index Acceptable value ≥90 | 109 | 110 | 96 | 110 | 110 | 95 | 110 |

Tables 1 and 2 show that, in Examples in which respective predetermined amounts of zinc oxide and stearic acid were added relative to the amount of the rubber component containing BR and an isoprene-based rubber in respective specific proportions, the rim chafing resistance, elongation at break, handling stability, and fuel economy were improved in a balanced manner compared to Comparative Example 1, and the number of broken spews was reduced.

In contrast, in Comparative Examples 2 to 15 in which at least one of the amounts of zinc oxide and stearic acid was out of the predetermined range, the fuel economy and handling stability were comparatively good, but the other propertie(s) were as low as the level causing practical problems, compared to Comparative Example 1. This means that the balance of the properties was bad.

The invention claimed is:

1. A pneumatic tire comprising a clinch and/or a chafer, said clinch and/or chafer being produced from a rubber composition comprising:
   100 parts by mass of a rubber component comprising 50 to 80% by mass of a butadiene rubber and 20 to 50% by mass of an isoprene-based rubber;
   1.2 to 2.9 parts by mass of zinc oxide based on 100% by mass of the rubber component; and
   2.2 to 4.0 parts by mass of stearic acid based on 100% by mass of the rubber component.

2. The pneumatic tire according to claim 1, wherein said rubber composition further comprises
   2.0 to 5.0 parts by mass of a vulcanization accelerator for each 100 parts by mass of the rubber component, and
   wherein
   the amount of zinc oxide in said rubber composition is 1.3 to 2.0 parts by mass and
   the amount of stearic acid in said rubber composition is 2.5 to 3.5 parts by mass, for each 100 parts by mass of the rubber component.

3. The pneumatic tire according to claim 1, wherein said rubber composition further comprises
   1.91 to 2.70 parts by mass of sulfur for each 100 parts by mass of the rubber component.

4. The pneumatic tire according to claim 1, wherein said rubber composition further comprises
   40 to 70 parts by mass of carbon black for each 100 parts by mass of the rubber component, and
   wherein the butadiene rubber in said rubber component comprises a 1,2-syndiotactic polybutadiene crystal.

* * * * *